United States Patent Office 2,867,148
Patented Jan. 6, 1959

2,867,148

INTERFEROMETERS

Harry Svante Svensson, Sundbyberg, Sweden, assignor to LKB-Produkter Fabriksaktiebolag, Stockholm, Sweden, a Swedish company Application January 21, 1953, Serial No. 332,206

Claims priority, application Sweden January 21, 1952

6 Claims. (Cl. 88—14)

This invention relates to interferometers capable of producing larger area and more brilliantly illuminated interference patterns than has been possible in the past.

Objects of the invention are to provide interferometers which are characterized by multiple slit or point light sources in place of the single slit or point light sources of the conventional interferometers.

These and other objects and the advantages of the invention will be apparent from the following specification when taken with the accompanying drawings, in which.

Figure 1:
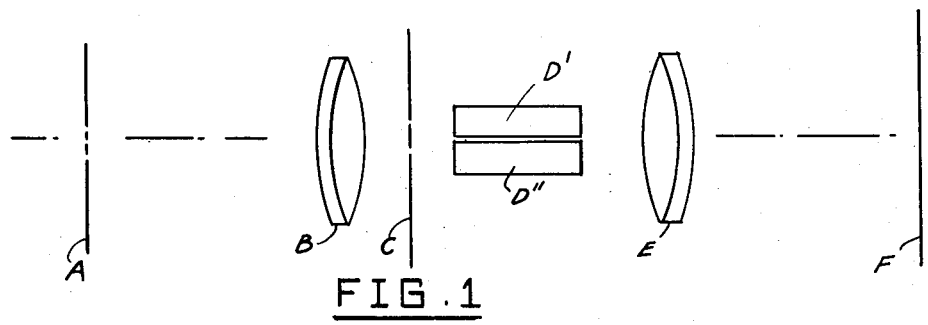
Fig. 1 is a schematic diagram of a classical form of Rayleigh interferometer as modified to constitute an embodiment of the invention.

An embodiment of the invention, as shown in Fig. 1 differs from the classical form of a Rayleigh interferometer in that it includes a line raster A with a plurality of parallel slits in place of the conventional light source diaphragm with a single slit. The remaining and conventional elements of the Rayleigh apparatus comprise a lens B, a diaphragm C with spaced apertures for passing light beams to a test optical object or cell D' and a reference optical object or cell D'' which each have a constant optical thickness in the direction of the light beams, and an observation plane or light indicating device F. In the optical image of the Rayleigh single slit, which is more or less blurred due to the diffraction at the small openings of diaphragm C, fringes are then formed due to the interference between the two beams of light. These fringes shift laterally when the refractive index in one of the objects or cells is altered, which offers possibilities of using the interferometer for measurement of refractive index.

The interference fringes are found within the diffraction fringes which are the result of the action of one single aperture of diaphragm C. Since the lateral diffraction fringes are very faint in comparison with the central one, the extension $\epsilon$ of the interference pattern can be said to be identical with that of the central diffraction fringe, and that is determined by the equation:

$$\epsilon = \frac{2D\lambda}{b} \qquad (1)$$

where D is the optical distance between the apertures of diaphragm C and the image plane, $\lambda$ the wave-length of the light and $b$ the width of each aperture. The size of the interferogram is consequently only influenced by D and $b$. Either way, i. e. by varying D or $b$, in order to get larger interferograms brings about an appreciable reduction of the light intensity and also other disadvantages.

The distance $\delta$ between the fringes of the interferogram is determined by the equation:

$$\delta = \frac{D\lambda}{d} \qquad (2)$$

where $d$ is the distance between the centres of the two apertures of diaphragm C. A comparison between the Equations 1 and 2 reveals that the number of fringes in the interferogram depends on the ratio $d:b$.

The width of the single light source slit of the conventional Rayleigh apparatus must not be larger than the size required to make its optical image, in the absence of diffraction, smaller than the interference fringes. It follows that, when $d$ increases and thereby the interference fringes come closer and become thinner, it is necessary to reduce the width of the light source slit if the interference fringes are not to be blurred. Thus one finds that an increase in the number of fringes at a constant size of the interferogram also leads to a reduction of the light intensity.

To sum up, it can thus be stated that the size of the interferogram as well as the number of fringes within it are limited by the available light intensity, this limitation being so serious that it is practically impossible to use interferograms with more than 10–15 fringes and of a breadth exceeding a few millimeters.

The present invention shows a way to remove this limitation, and by its aid it is possible to produce interferograms of hundreds and even thousands of fringes distributed over a surface of a convenient size. The brightness of these interferograms does not stay behind, on the contrary it is superior to that of the classical Rayleigh interferograms.

This result is achieved by using a line raster A, i. e. a great number of mutually parallel slits as the light source, instead of using a single slit. It is easily realized that, if an interferogram with, say, 9 fringes can be produced by using one slit-shaped light source, it should be possible to get 18 fringes by using 2 slits, 27 fringes by 3 slits, and so on, if the slits are placed at such mutual distances that the interferograms do not coincide. If the added slits are placed closer to each other, the individual interferograms will overlap, and there will be a risk of mutual blurring. There must, however, also be certain distances between the light source slits for which the different interferograms reinforce each other. If such distances are properly chosen, two new advantages are achieved: the brightness becomes greater, and the interference fringes mutually get a more even light intensity (in the classical interferometer the central fringes are brightest, and the intensity declines successively towards zero in both directions). The greatest possible light intensity, and the greatest possible uniformity thereof, are obtained if matters are so arranged that the first interference fringe No. 1 from light source slit from the first raster slit coincides with the second interference fringe from the second light source slit, with the third interference fringe from the third light source slit, and so on throughout the entire interferogram.

Evidently a coincidence condition has to be satisfied if reinforcement and not blurring shall be the result of the cooperation between the different slits. This condition can be formulated as follows: the optical image of the raster in the absence of diffraction, i. e. with the diaphragm C removed, shall coincide with the interference pattern when the double stop is in place. If the magnification of the imagery of the raster on to the observation plane F is called G and the distance between the centres of the raster lines $e$, the coincidence condition can consequently be written $Ge = D\lambda/d$, or:

$$Gde = D\lambda \qquad (3)$$

Rasters with 2, 3, 4, etc. times greater distance between the lines of course also satisfy the coincidence condition, but give a light intensity that is less than the greatest possible one and is simultaneously varying across the interferogram. A more generic equation for the coincidence condition is consequently.

$$Gde = mD\lambda \qquad (4)$$

where $m$ is a positive integer.

Figure 2:
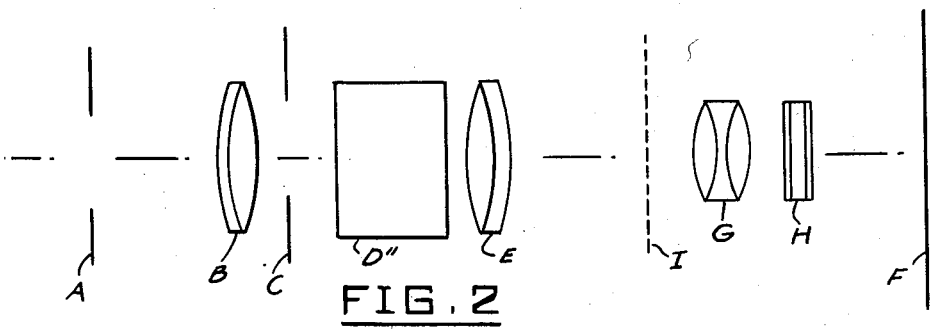
Figs. 2 and 3 are, respectively, a schematic elevation and a schematic plan view of another embodiment of the invention.

The invention can also be used in the modified Rayleigh interferometer described by Calvet and Chevalerias (J. chim. phys. 43, 37, 1946) and by Philpot and Cook (Research 1, 234, 1948). Their interferometer designs are not quite identical, but both can be shown schematically in Figs. 2 and 3. Since this modified interferometer makes use of an astigmatic lens system, with different dioptric properties in two mutually perpendicular sections, Fig. 2 shows the optical system in elevation and Fig. 3 the same in plan. As distinguished from prior proposals, the light source A is a multiple slit raster instead of a single slit or a pin-hole. Otherwise the interferometer differs from the conventional Rayleigh interferometer only in that the lens system B, E, G, H is astigmatic and so adjusted that the light source apertures A and the light-indicating device F are optically conjugate in a section in which the extension of the light source apertures is small, and so that the plane through the middle of the cell D' and the light-indicating device F are optically conjugate in a section perpendicular thereto. The former optical imagery retains the interference conditions, while the latter imagery removes the necessity of constant optical thicknesses of the objects D' and D". They may now vary in the section where the cells are optically conjugate to the light-indicating device F. The astigmatically modified Rayleigh interferometer is thus capable of recording continuously variable optical thicknesses in objects where the optical thickness gradient has a constant direction. This is, for example, the case with stratified solutions in planoparallel cells. The refractivity gradient is then vertical. The cells have to be optically conjugate to the light-indicating device F in a vertical section. If the light source apertures are slits, in accordance with the invention, they must be vertical, and the said slits must be optically conjugate to the light-indicating device in a horizontal section.

The features which are common to the prior classical and to the prior astigmatically modified Rayleigh interferometer are thus the following: Both interferometers are characterized by a light source aperture of small extension in at least one direction; by a double apertured diaphragm C which splits the radiation from the light source into two coherent beams of light directed to a transparent object D' with an optical thickness that is constant in at least the above-mentioned direction, and to a reference object D" with an optical thickness that is essentially the same as that of the object D' and that is also constant in the same direction; by a light-indicating device F; and by a lens system that makes the planes of the light source aperture and the light-indicating device optically conjugate at least in the section in which the optical thicknesses of the objects D' and D" are constant and in which the extension of the light source aperture is small.

The reason why a pin-hole could be used in the astigmatic modification of the Rayleigh interferometer instead of a slit is the fact that its optical image at the light-indicating device F, due to the action of the astigmatic lens system, is a bright line, just as the optical image of a slit. The two types of light source apertures give thus identical interference patterns, which only differ in light intensity.

As already stated, the present invention can also be applied to this astigmatic modification of Rayleigh's interferometer. When starting from such an interferometer with a slit, this slit is replaced by a line raster A satisfying Equation 4, just as in the classical interferometer. If the interferometer included a pin-hole as the light source aperture, this pin-hole is replaced by a rectilinear row of pin-holes, the mutual center distances of which, in the section where the light source aperture A and the light-indicating device F are optically conjugate and satisfy Equation 4.

Figure 3:
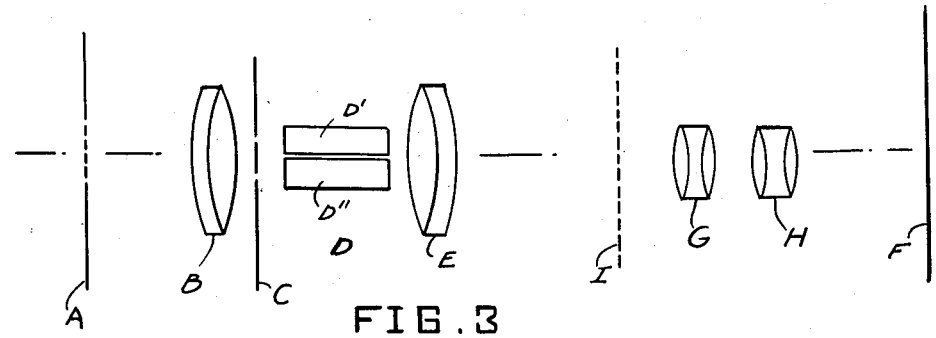
Figure 4:
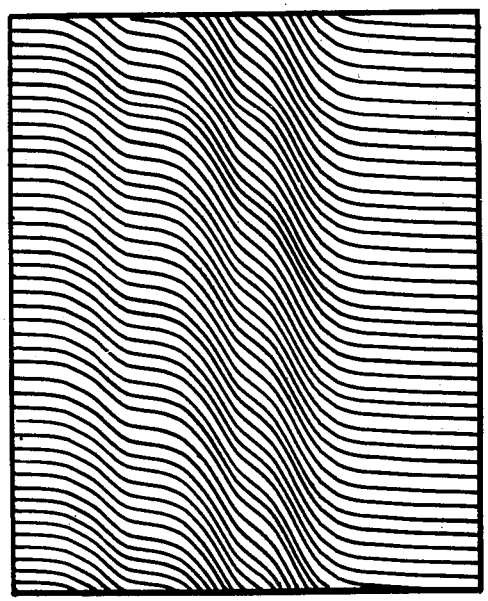
Fig. 4 is an interferogram such as obtained with the apparatus shown schematicaly in Figs. 2 and 3.

Fig. 4 shows a multi-fringe interferogram from a stratified solution in a cell placed in an optical system according to Figs. 2–3. It has been obtained by using a vertical line raster at A, with the spacing $e$ between the raster lines satisfying Equation 3. Because of the large size of the interferogram and of the large number of fringes therein, many fringes can be followed throughout the whole cell, and each fringe has the form of the refractive index curve of the solution in the cell.

Philpot (Nature, 141, 283, 1938) and Svensson (Kolloid-Z., 87, 181, 1939) have described an optical arrangement for making direct records of the refractive index gradient of stratified solutions. This arrangement also makes use of an astigmatic lens system and differs from the optical system of the astigmatic Rayleigh interferometer only in the following respects. The light source aperture has to be slit-shaped and perpendicular to the gradient of the optical thickness of the object D'. Between the optically conjugate image planes of the light source aperture, A, and the light-indicating device F, there has to be an intermediate plane I which is optically conjugate to the light source plane in both sections. In this intermediate plane I there is a partially light-obstructing device, which can be defined as a mechanical element with at least one sharp edge between transparent and opaque material, which edge forms an acute angle with and crosses the optical image of the light source slit. The action of this optical system is as follows. Light is deflected in the object through an angle proportional to the magnitude of the gradient of the optical thickness, and consequently the optical image of the light source slit in the plane I is deflected a distance proportional to the same quantity. The point of intersection between the slit image and the sharp edge of the partially light-obstructing device in the plane I receives, due to the acute angle between them mentioned above, a displacement with a component in the direction perpendicular to the light deflection, i. e. perpendicular to the gradient of the optical thickness of the object. This component is, due to the optical imagery between the planes I and F in a section perpendicular to the gradient, transferred to the light-indicating device F, where, consequently, the boundary between a bright and a dark field is displaced a distance proportional to the gradient of the optical thickness. On the other hand, in the section parallel to the gradient, we have optical imagery between the object D' and the light-indicating device F. It is then logically evident that the boundary between dark and bright fields on the light-indicating device F will be displaced according to the local values of the gradient in the object D', i. e. said boundary line will be an automatic record of the magnitude of the gradient as a function of the coordinate along the direction of the gradient.

In my copending application Ser. No. 211,888, filed Feb. 20, 1951, issued as U. S. Patent No. 2,703,033, March 1, 1955, and in a recent publication (Svensson, Acta Chemica Scandinavica, 4, 399, 1950), I have shown that this optical arrangement for recording the gradient can be combined with the astigmatic modification of Rayleigh's interferometer, giving records of the optical thickness itself. The present invention, characterized by a multiple light source aperture, can now be applied in connection with this combined optical technique too. A combined recording of the optical thickness and its gradient with the use of a multiple source can be accomplished in two principally different ways.

Figure 5:
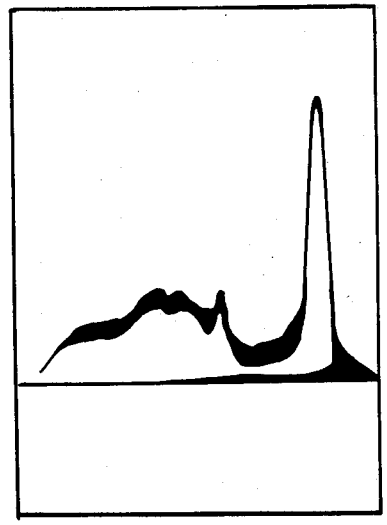
Fig. 5 is a reproduction of a combined interferogram as in Fig. 4 and a curve of the refractive index gradient.

According to the first method, a narrow horizontal slit (serving the gradient-recording method) and a vertical raster (serving the Rayleigh interference method) placed side by side in the plane A, Figs. 2 and 3, are used as the light source. Since the plane F of the light-indicating device and the plane A are optically conjugate, it follows that a diagram of the refractive index gradient is obtained at F in the optical image of the horizontal slit, and that an interferogram such as that in Fig. 4 is obtained in the optical image of the raster, whereas the combined image of the refractive index gradient superposed over a part of the interferogram is reproduced as Fig. 5. A still more detailed description of the optical system pertaining to this combined recording procedure was given in the article cited. The novelty in comparison with the apparatus disclosed in the article is the use of a line raster instead of a single vertical slit for forming the interferogram.

Figure 6:
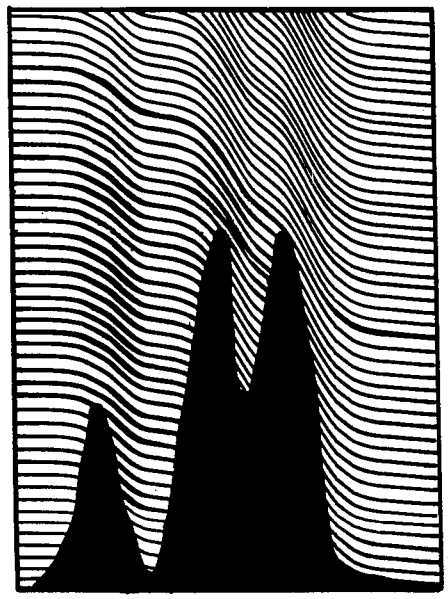
Figs. 6–8 are reproductions of other interferograms obtainable with the apparatus of Figs. 2 and 3.
Figure 7:
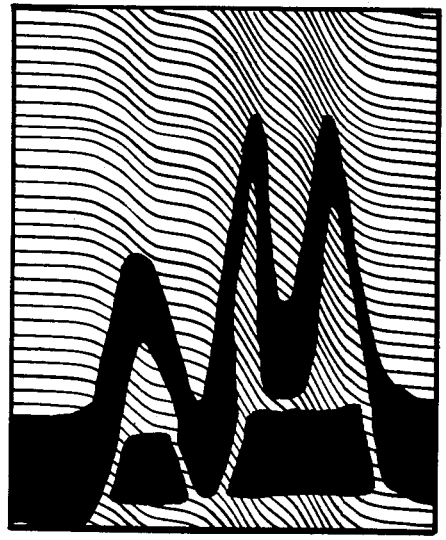
Figure 8:
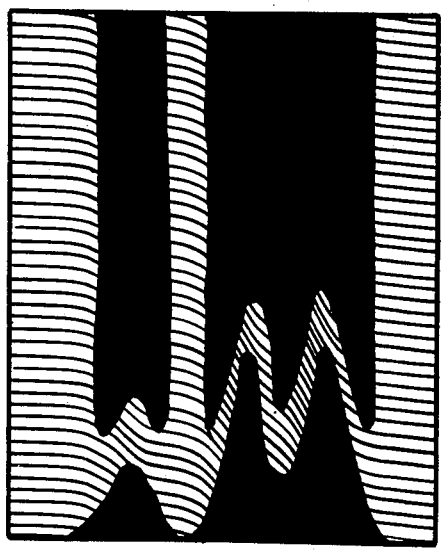

According to the second method, a horizontal row of luminous points is used as a light source, the distance $e$ between the points satisfying the Equation 4. Such a row of points can for instance be obtained by placing a vertical raster behind a horizontal slit. Such a row of points can for instance be obtained by placing a vertical line raster behind a horizontal slit. Such a light source arrangement satisfies at the same time the requirement of the gradient-recording method of small vertical and appreciable horizontal extension, and the requirement of the Rayleigh interferometer of one or several light apertures of small horizontal extension. If records are produced according the above-mentioned derivative-recording method with this light source, results such as shown in the Figs. 6, 7, and 8 are obtained. These records have in common the property of being interferograms obtained by the aid of multiple light source apertures according to this invention, but, on account of the light obstructions characteristic of the derivative-recording technique, the interference fringes disappear within certain fields of the picture. The locus of the end points of the fringes then form a curve which is identical with the refractive index derivative with respect to the vertical cell coordinate. Pictures of the type shown in Fig. 6 are obtained by the use of a diagonal edge, pictures of the type shown in Fig. 7 by the use of a diagonal thread, and pictures of type shown in Fig. 8 by the use of a diagonal slit as the partially light-obstructing device in the plane I of Figs. 2 and 3, i. e. in the first image plane of the light source apertures.

I claim:

1. An optical arrangement for interferometry comprising a diaphragm provided with a plurality of apertures of small extension in at least one direction, means to illuminate said apertures whereby to define a light source, diaphragm means providing a double aperture which splits the radiation from the light source into two coherent beams of light, a test object in the path of one of said beams with an optical thickness in the direction of the optic axis that is constant at least in a section through said axis in which the extension of the light source apertures is small; a reference object in the path of the other light beam with an optical thickness that is essentially the same as that of the test object and that is also constant at least in said section, a light-indicating device, and a lens system making the planes of the light source apertures and the light-indicating device optically conjugate at least in said section through the optic axis; the centre spacing $e$ between the light source apertures satisfying the equation $Gde = mD\lambda$, where G is the magnification factor of the optical imagery from the light source apertures to the light-indicating device, $d$ the distance between the centres of the two apertures of said diaphragm means, D the optical distance between said diaphragm means and the light-indicating device, $\lambda$ the wavelength of the light, and $m$ an arbitrary positive integer.

2. An optical arrangement for interferometry comprising a diaphragm formed and arranged to produce a line raster when illuminated, means to illuminate said diaphragm to define a light source, diaphragm means providing a double aperture which splits the radiation from the light source into two coherent beams of light, a test object in the path of one light beam with an optical thickness in the direction of the optical axis that is constant in two mutually perpendicular sections through the optic axis, a reference object in the path of the other light beam with an optical thickness that is essentially the same as that of the test object and that is also constant in two mutually perpendicular sections through the optical axis, a light-indicating device; and a spherical lens system making the planes of the raster and of the light-indicating device optically conjugate in two mutually perpendicular sections through the optical axis; the centre spacing $e$ between the raster lines satisfying the equation $Gde = mD\lambda$, where G is the magnification factor of the imagery from the raster to the light-indicating device, $d$ the distance between the centres of the two apertures of the diaphragm means, D the optical distance between said diaphragm means and the light-indicating device, $\lambda$ the wavelength of the light, and $m$ an arbitrary positive integer.

3. An optical arrangement for interferometry comprising a diaphragm provided with a plurality of apertures of small extension in at least one direction, means to illuminate said apertures to define a light source, diaphragm means providing a double aperture which splits the radiation from the light source into two coherent beams of light, a test object in the path of one of said light beams with an optical thickness in the direction of the optical axis that is constant in a section through said axis in which the extension of the light source apertures is small, a reference object in the path of the other light beam with an optical thickness that is essentially the same as that of the test object and that is also constant in said section, a light-indicating device, and an astigmatic lens system making, in said section through the optic axis, the light source diaphragm, and in a section perpendicular thereto, the plane through the middle of the object optically conjugate to the light-indicating device, the centre spacing $e$ between the luminous apertures satisfying the equation $Gde = mD\lambda$, where G is the magnification factor of the optical imagery from the light source diaphragm to the light-indicating device, $d$ the distance between the centres of the diaphragm means, D the optical distance between said diaphragm means and the light-indicating device, $\lambda$ the wave-length of the light, and $m$ an arbitrary positive integer.

4. An optical arrangement according to claim 3 wherein said lens system provides, between said objects and the light-indicating device, an intermediate plane optically conjugate to the plane of the light source diaphragm in all sections through the optical axis and to the light-indicating device in a section through the optical axis in which the optical thicknesses of the object and the reference object are constant and in which the extension of the light source apertures is small, in combination with a partially light-obstructing device in said intermediate plane and comprising at least one sharp edge between transparent and opaque material, said edge forming an acute angle with the above-mentioned section through the optical axis.

5. An optical arrangement according to claim 4, in combination with a narrow slit light source at the side of said first-named diaphragm and parallel to the section in which the optical thickness of said objects is constant, and wherein said partially light-obstructing device cuts the optical image of said narrow slit light source in said intermediate plane.

6. An optical arrangement as recited in claim 4, wherein said light source diaphragm is provided with a rectilinear row of holes, the rectilinear row being parallel to the section through the optical axis in which the optical thickness of said objects is constant, and wherein said partially light-obstructing device cuts the optical image of said row of holes in said intermediate plane at an acute angle.

References Cited in the file of this patent

FOREIGN PATENTS 355,911     Great Britain _____ Sept. 3, 1931

OTHER REFERENCES

"Analytical Chemistry," vol. 24, No. 4, April 1952, pages 654–660 cited.

Mortensen: "Improved Schlieren Apparatus Employing Multiple Slit Gratings," Rev. of Scientific Instruments, vol. 21, pages 3–6, January 1950.

"Journal of the Optical Society of America," vol. 40, No. 7, pages 480 and 481 cited, July 1950.

Miller et al.: "Sharp-Focussing Schlieren System," Photographic Engineering, vol. 1, pages 119–129, October 1950.

Svensson: "Method for Production of High-Intensity, Multi-Fringe Rayleigh Interference Patterns," vol. 5, pages 1301–1310, Acta Chemica Scandinavica (1951).